(12) United States Patent
Bui et al.

(10) Patent No.: US 6,937,413 B2
(45) Date of Patent: Aug. 30, 2005

(54) TAPE SERVO INFORMATION WITH SUPERIMPOSED DATA INFORMATION PROVIDING SERVO BAND IDENTIFICATION

(75) Inventors: Nhan Xuan Bui, Tucson, AZ (US); James Howard Eaton, Morgan Hill, CA (US); Junichi Fukuda, Sagamihara (JP); Glen Alan Jaquette, Tucson, AZ (US); Eiji Ogura, Yokohama (JP); Mark Allan Taylor, Tucson, AZ (US); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 10/638,080

(22) Filed: Aug. 8, 2003

(65) Prior Publication Data

US 2005/0030662 A1 Feb. 10, 2005

(51) Int. Cl.[7] .................................................. G11B 5/09
(52) U.S. Cl. ..................... 360/48; 360/49; 360/72.3; 360/75; 360/78.02; 360/77.12; 360/72.1
(58) Field of Search ..................... 360/48, 49, 72.3, 360/75, 78.02, 77.12, 72.1, 46, 77.02, 77.2

(56) References Cited

U.S. PATENT DOCUMENTS

| | | | |
|---|---|---|---|
| 5,121,270 A | | 6/1992 | Alcudia et al. .......... 360/77.01 |
| 5,689,384 A | | 11/1997 | Albrecht et al. ......... 360/77.12 |
| 5,930,065 A | * | 7/1999 | Albrecht et al. ........... 360/72.2 |
| 6,021,013 A | | 2/2000 | Albrecht et al. .............. 360/53 |
| 6,031,673 A | * | 2/2000 | Fasen et al. ................... 360/53 |
| 6,169,640 B1 | | 1/2001 | Fasen .......................... 360/48 |
| 6,282,051 B1 | | 8/2001 | Albrecht et al. .............. 360/75 |
| 6,320,719 B1 | * | 11/2001 | Albrecht et al. ......... 360/77.12 |
| 6,462,904 B1 | | 10/2002 | Albrecht et al. ............ 360/122 |
| 6,525,898 B1 | | 2/2003 | Chliwnyj et al. ........ 360/77.12 |
| 2004/0032685 A1 | * | 2/2004 | Trabert et al. ................ 360/75 |

FOREIGN PATENT DOCUMENTS

EP 0940805 A2 8/1999 ........... G11B/5/584

* cited by examiner

Primary Examiner—David Hudspeth
Assistant Examiner—Dismery Mercedes
(74) Attorney, Agent, or Firm—John H. Holcombe

(57) ABSTRACT

In magnetic tape having separate longitudinal servo bands of servo information with superimposed data information, the separate servo bands have selected different superimposed data information, to identify the separate servo bands for independent addressability. The servo information comprises non-parallel laterally extending transitions to indicate lateral positioning, and the selected different superimposed data information may comprise a lack thereof in portion(s) of the servo bands. Where the superimposed data information is longitudinal position information of the tape, the selected different superimposed data information may comprise different longitudinal position information of one or more servo band(s). The selected different superimposed data information may comprise a band identifier in the superimposed data information of one or more of the servo bands.

7 Claims, 8 Drawing Sheets

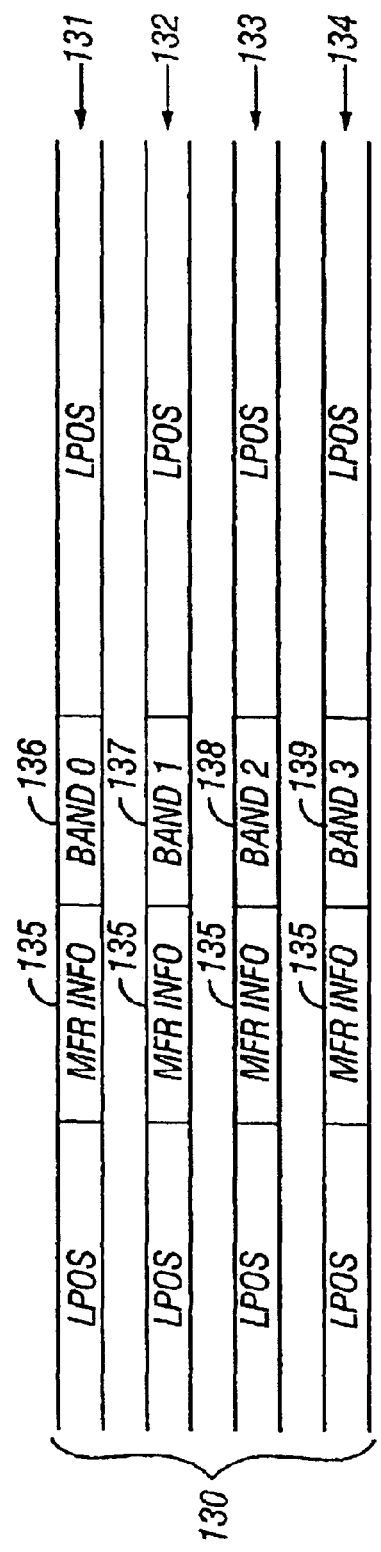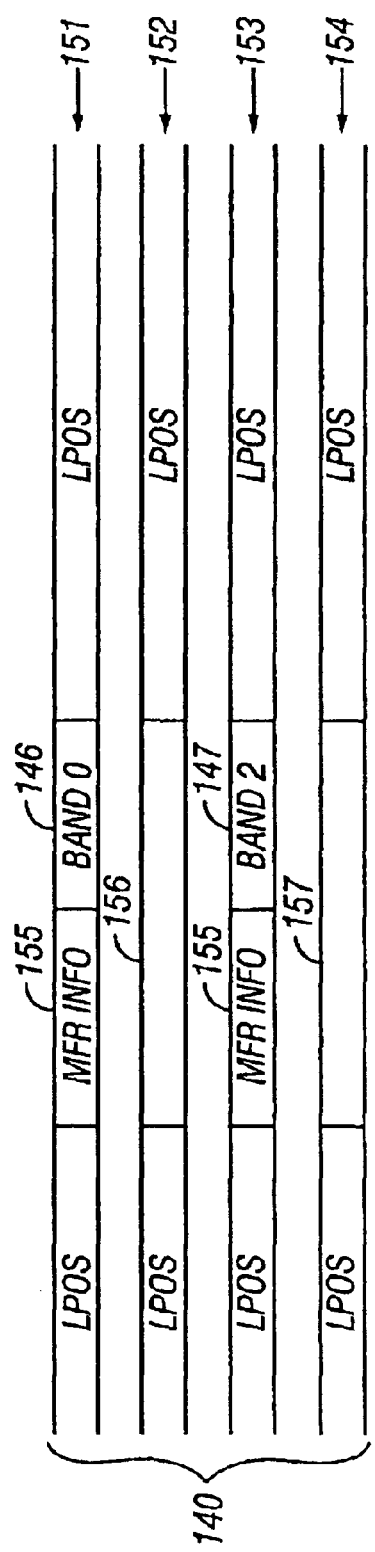

TAPE SERVO INFORMATION WITH SUPERIMPOSED DATA INFORMATION PROVIDING SERVO BAND IDENTIFICATION

DOCUMENT INCORPORATED BY REFERENCE

Commonly assigned U.S. Pat. No. 5,930,065, Albrecht et al., is incorporated for its showing of magnetic tape media having data information superimposed on track following servo information.

FIELD OF THE INVENTION

This invention relates to separate longitudinal servo bands which are laterally positioned on a magnetic tape media, and, more particularly, to identification of the servo bands for independent addressability.

BACKGROUND OF THE INVENTION

Magnetic tape media comprises a medium for storing large amounts of data, and typically comprises a plurality of data tracks that extend longitudinally along the tape. A tape head is employed for reading and/or writing data on the data tracks, and is typically shared between various data tracks or groups of data tracks, and is moved between tracks or groups of tracks in the lateral direction of the tape. The tape head typically comprises a number of separate elements which read and/or write data with respect to a number of parallel data tracks, and is provided with one or more separate servo read transducers, which are laterally offset from the read and/or write elements, so as to track follow a servo band and be guided along the data track or tracks. A servo band provides the servo guidance along any of several paths within the band, and the tape head is repositioned laterally within a servo band so that the read and/or write elements access different data tracks. The servo bands are continuous to provide constant track following. U.S. Pat. No. 5,121,270 attempted to employ a system called a "servo" for magnetic tape, but without servo bands, and without track following. Rather, the tape head was stepped between data tracks. Narrow (data track width) longitudinal binary patterns of blocks were provided, such that a "servo" transducer straddling two laterally adjacent binary patterns would indicate the track address from the binary patterns, and, if the amplitudes of each sensed binary block was one-half of full amplitude, the stepped head would theoretically be "on-track", but the sensed servo signal would actually go on or off due to the absence of blocks at one or the other of the laterally adjacent binary patterns, making the patterns discontinuous. Further, since the blocks were of the same frequency, the transducer servo could not identify which side of the straddled line contained a sensed block, preventing track following. Only if the amplitudes were dramatically different, would the head be stepped a small amount and the patterns retested. Tape, even though it may be guided laterally, is subject to lateral shifting as it is moved longitudinally, such that establishing a stepped position of a head for each data track would require low densities of data tracks, and, in contrast, track following allows high densities of data tracks to be utilized. Servo bands, such as those of the incorporated '065 patent allow for track following for each of a number of paths across the servo band.

One type of servo system for magnetic tape media is one in which a plurality of separate servo bands are laterally positioned on the magnetic tape media. Each of the servo bands provides the servo guidance for a group of data tracks, and the servo transducer of the tape head is repositioned laterally within a servo band so the read and/or write elements access different data tracks, and is repositioned laterally to another servo band to access still further data tracks. In one example, the servo bands are spaced apart and the data tracks are located between the servo bands. To insure that the servoing is precise, two servo transducers may be provided at either end of the tape head, straddling the data read and/or write elements. The lateral positioning may be obtained from either or both servo bands. The servo bands are encoded with essentially identical patterns for determining lateral position, such that the bands are substantially indistinguishable.

The lateral positioning of the tape head is typically accomplished by actuators, which may have mechanical or electromechanical components. Once the proper lateral positioning of the tape head has been accomplished, as the servo information being sensed by the servo transducer indicates, minor adjustments of the head to follow lateral movement of the tape or of the tracks on the tape may be made. During track following, sticking or other failure of the mechanical or electromechanical components can be ascertained from failure of the sensed servo information to show any correction. Similarly, lateral repositioning of the tape head to different tracks within the same servo band is accomplished by a continuous adjustment of position within the servo band. Hence, any sticking or other failure of the mechanical or electromechanical components can be ascertained by failure of the sensed servo information to show the desired movement.

However, the lateral repositioning of the head between the servo bands is typically conducted by a coarse actuator which, also typically, operates in open loop without feedback. Thus, as the tape head is repositioned between the servo bands, there is no feedback from the servo information to indicate that the switch from one servo band to any other servo band was successful, and, if the servo bands are substantially indistinguishable, at the supposed completion of the lateral movement, the tape head may be positioned at the wrong servo band, and the servo information will not indicate an error.

One way of determining whether the lateral movement has caused the tape head to be positioned at the correct servo band, is to provide a separate "independent" sensor, for example, that determines the approximate lateral position of the head with respect to the tape. Such an independent sensor may comprise a coarse optical sensor that measures the physical position of the head. Such a coarse sensor cannot be used for track following, but provides a backup to the actual servo system. Such extra sensors add cost to a tape drive, which is always undesirable, if the extra cost can be avoided. Another example is shown by U.S. Pat. No. 6,169,640, in which timing based servo bands are longitudinally displaced or offset from each other, such that simultaneously sensing two adjacent servo bands allows the servo system to determine the longitudinal offset between servo bands, from which the data band location of the tape head can be determined. The system, however, requires that both servo bands be sensed simultaneously in order to establish a differentiation and make a determination.

SUMMARY OF THE INVENTION

The present invention comprises a magnetic tape media having prerecorded servo information comprising a plurality of separate servo bands extending longitudinally along the magnetic tape media; and comprising servo information and data information superimposed in the servo information, arranged to identify the separate servo bands for independent addressability. The servo information comprises pairs of non-parallel laterally extending transitions indicating lateral positioning across the servo band, and each separate servo band is laterally offset from and providing lateral servo information for a plurality of parallel longitudinally extending data tracks. The superimposed data information comprises adjustments in the longitudinal direction to selected non-parallel laterally extending transitions; and the separate servo bands have selected different superimposed data information of the servo and superimposed data information, to identify the separate servo bands.

In one embodiment, the selected different superimposed data information comprises a lack of the superimposed data information in at least a portion of at least one of the plurality of separate servo bands, to identify the separate servo bands.

In another embodiment, where the superimposed data information comprises longitudinal position information to identify longitudinal position along the magnetic tape media, the selected different superimposed data information comprises different longitudinal position information of at least one of the plurality of separate servo bands with respect to at least another servo band, to identify the separate servo bands.

In a further embodiment, the selected different superimposed data information comprises at least a band identifier provided in the superimposed data information of at least one of the plurality of separate servo bands, to identify the separate servo bands.

In an embodiment where the separate servo bands are positioned in sequence laterally with respect to the magnetic tape media; where the servo information comprises patterns of bursts of the laterally extending transitions, a transition of each of the pairs of the laterally extending transitions positioned in a separate one of the bursts in a pattern, to provide timing based lateral servo information; where the patterns of the separate servo bands are laterally aligned; wherein the superimposed data information comprises longitudinal position shifts to selected pairs of the transitions; the selected different superimposed data information may additionally comprise different longitudinal position shifts to selected pairs of transitions of at least one of the patterns of at least one of the plurality of separate servo bands with respect to the next separate servo band in the sequence, to identify the separate servo bands.

For a fuller understanding of the present invention, reference should be made to the following detailed description taken in conjunction with the accompanying drawings.

BRIEF DESCRIPTION OF THE DRAWINGS

FIG. 6 is a representation of segments of four separate servo bands of FIG. 1, having an embodiment of selected different superimposed data information, in accordance with the present invention, comprising band identifiers provided in the superimposed data information of the separate servo bands;

FIG. 7 is representation of segments of four separate servo bands of FIG. 1, having an embodiment of selected different superimposed data information, in accordance with the present invention, comprising band identifiers provided in the superimposed data information of two of the separate servo bands, and a lack of the superimposed data information in a portion of two of the separate servo bands;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
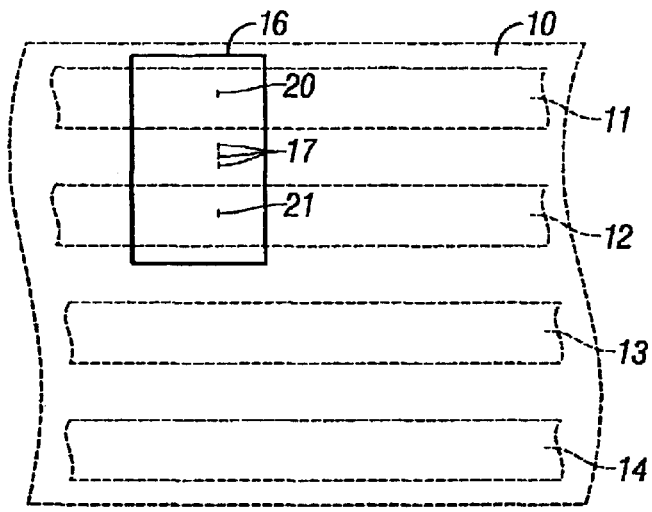
FIG. 1 is a schematic representation of a tape head and a segment of a magnetic tape media with a plurality of separate servo bands in accordance with the present invention.
Figure 2:
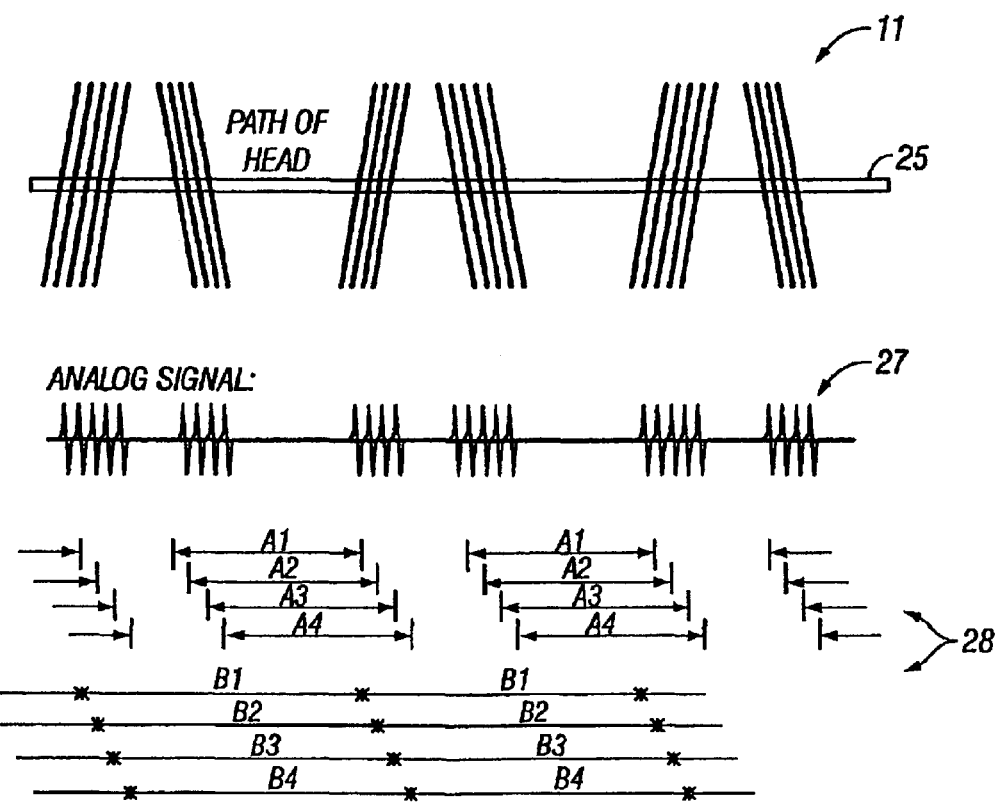
FIG. 2 is a representation of a servo transducer as it tracks one of the servo bands of FIG. 1, along with a representation of the servo output signal it generates and the corresponding signal intervals.

FIGS. 1 and 2 illustrate a servo system and a magnetic tape media 10, the magnetic tape media having a plurality of separate longitudinal servo bands 11, 12, 13 and 14, which are laterally positioned on the magnetic tape media, and which are identifiable in accordance with the present invention. The example of FIG. 1 comprises a magnetic tape media with magnetically written servo bands, and with data tracks positioned between the servo bands. The magnetic tape media is read and/or written by a tape head 16 of a magnetic tape drive. A tape head typically comprises a number of separate elements 17, which read and/or write data with respect to a number of parallel data tracks, and is provided with a separate servo transducer, or servo transducers 20, 21, which are offset from the read and/or write elements 17, so as to track follow the servo band and be guided along the data track or tracks.

FIG. 2 illustrates a servo transducer path 25 as the servo transducer tracks one of the servo bands of FIG. 1, e.g. servo band 11, along with a representation of the generated servo output signal 27 and the corresponding signal intervals 28. The exemplary servo band is of the type described in the incorporated '065 patent, which comprises patterns of non-parallel laterally extending transitions recorded across the width of the servo band. The timing 28 of the signal 27 derived from reading at any point across the width of such a pattern varies continuously as the servo transducer 20 of FIG. 1 is moved laterally across the servo band, since the servo transducer 20 is small compared to the width of the servo pattern. Lateral position sensing is achieved by deriving a ratio of two servo pattern intervals "A" and "B" of FIG. 2 and therefore is insensitive to tape speed during reading.

Figure 3:
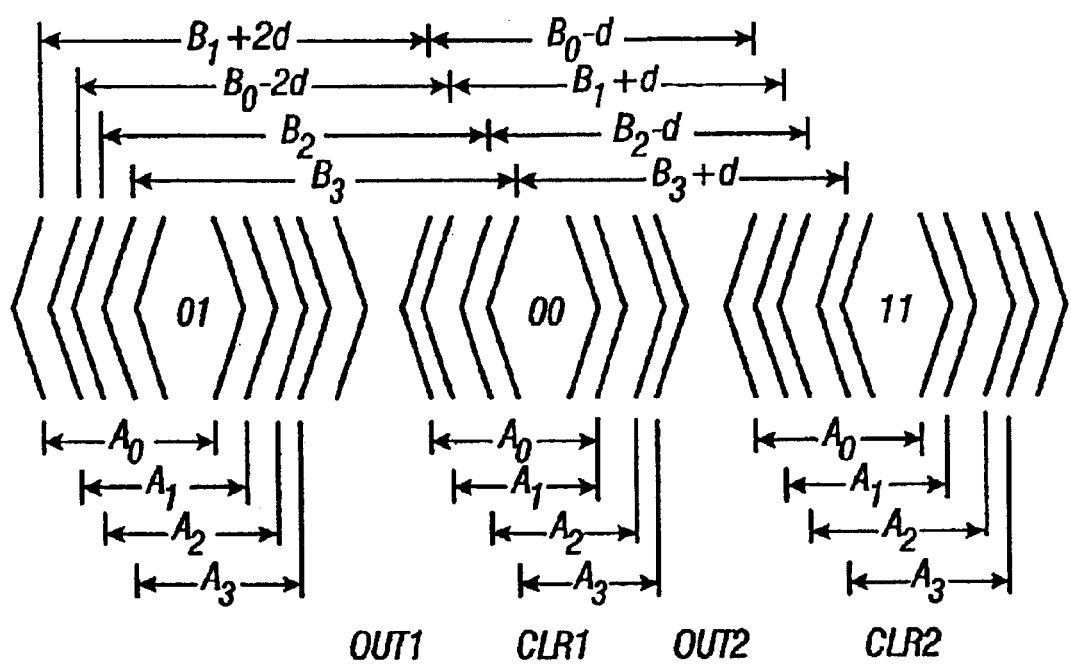
FIG. 3 is a representation of an exemplary combined servo and superimposed data information of the prior art.

FIG. 3 illustrates an exemplary portion 30 of a servo band having combined servo and superimposed data information in accordance with the incorporated '065 patent. Ones of the non-parallel laterally extending transitions are adjusted or shifted in the longitudinal direction to superimpose data information on the servo information of FIG. 2. As discussed in the '065 patent, the adjustments, "+d" or "−d", are to pairs of the transitions, and are in offsetting directions, so that there is no net change to the "A" and "B" track following intervals in a pattern of bursts of pairs to affect the track following servo. The adjustments "+d" or "−d" in the longitudinal direction to selected pairs of non-parallel laterally extending transitions represent binary bits, and comprise encoded data superimposed on the track following servo information. The encoded superimposed data in the example 30 of FIG. 3 is shown as the bit sequence "01 00 11". The superimposed data is tachometer information, also called longitudinal position information, or "LPOS", which indicates the longitudinal position along the tape of the tape head. Other information which may also be encoded is "manufacturer's information", such as the type of cartridge, length of tape, manufacturer, media type, etc. The identical information is encoded in each of the servo bands, since the tape drive employs the longitudinal position information for various functions, without regard for the servo band from which the longitudinal position information is obtained.

Referring to FIG. 1, the read and/or write head elements 17 are typically shared between various data tracks or groups of data tracks, and is moved between tracks or groups of tracks in the lateral direction of the tape. Each of the servo bands 11, 12, 13 and 14, provides the servo guidance for a group of data tracks, and the servo transducer 20, 21 of the tape head is repositioned laterally within a servo band to cause the read and/or write elements 17 to access different data tracks, employing the "A" and "B" track following intervals of FIG. 2 or of FIG. 3, and is repositioned laterally to another servo band to access still further data tracks. In one example, the servo bands are spaced apart to span the data tracks, which are located between the servo bands. This places a servo band close to the corresponding data tracks to reduce the span between the outer read and/or write elements and the servo band, and reduce sensitivity to changes in tape width between the time data is written and read back. To insure that the servoing is precise, two servo transducers 20, 21 of FIG. 1 may be provided at either end of the tape head 16, straddling the data read and/or write elements. The lateral positioning may be obtained from either of the two servo bands, or by averaging or otherwise comparing data from the two servo bands.

The lateral positioning of the tape head is typically accomplished by actuators, which may have mechanical or electromechanical components. Once the proper lateral positioning of the read and/or write elements 17 of the head 16 has been accomplished, as the servo information being sensed by the servo transducer 20, 21 indicates, minor adjustments of the head 16 to follow lateral movement of the tape or of the servo bands on the tape may be made. During track following, sticking or other failure of the mechanical or electromechanical components can be ascertained from failure of the sensed servo information to show any correction. Similarly, lateral repositioning of the tape head to different tracks within the same servo band is accomplished by a continuous adjustment of position within the servo band. Hence, any sticking or other failure of the mechanical or electromechanical components can be ascertained by failure of the sensed servo information to show the desired movement.

However, the lateral repositioning of the head from one of the servo bands 11, 12, 13 and 14, to another, is typically conducted by a coarse actuator, which may have mechanical or electromechanical components, and which typically operates without feedback. The lack of feedback may occur because no servo transducer is over a servo band as the tape head is moved from one servo band to another, or a pair of servo transducers are moved from two servo bands to another two servo bands. It can also occur if the actuation occurs while the tape is either stopped or is moving too slowly to read the servo band even though the servo transducer(s) may be over a servo band(s). Thus, as the tape head is repositioned between the servo bands, there is no continuous feedback from the servo information to indicate that the switch from one servo band to any other servo band was successful. The present invention indicates, at the completion of the lateral movement, the servo band position of the tape head.

In accordance with an aspect of the present invention, wherein the separate servo bands 11, 12, 13 and 14, are positioned laterally across the magnetic tape media; where the servo information comprises pairs of non-parallel laterally extending transitions indicating lateral positioning across the servo band, each separate servo band laterally offset from, and providing lateral servo information for, a plurality of parallel longitudinally extending data tracks; and where the superimposed data information comprises adjustments in the longitudinal direction to selected non-parallel laterally extending transitions; in accordance with the present invention, the separate servo bands have selected different superimposed data information of the servo and superimposed data information, to identify the separate servo bands. Identification of the separate servo bands allows independent addressability of the servo bands and provides feedback regarding servo band positioning of the servo transducer.

The selected different superimposed data information of the present invention may be stored in memory and employed to determine the servo band being sensed. Once the servo band has been determined, it may be that the lateral movement of the tape is sufficiently constrained that no further determination is required unless the servo transducer is moved to another servo band.

Figure 4:
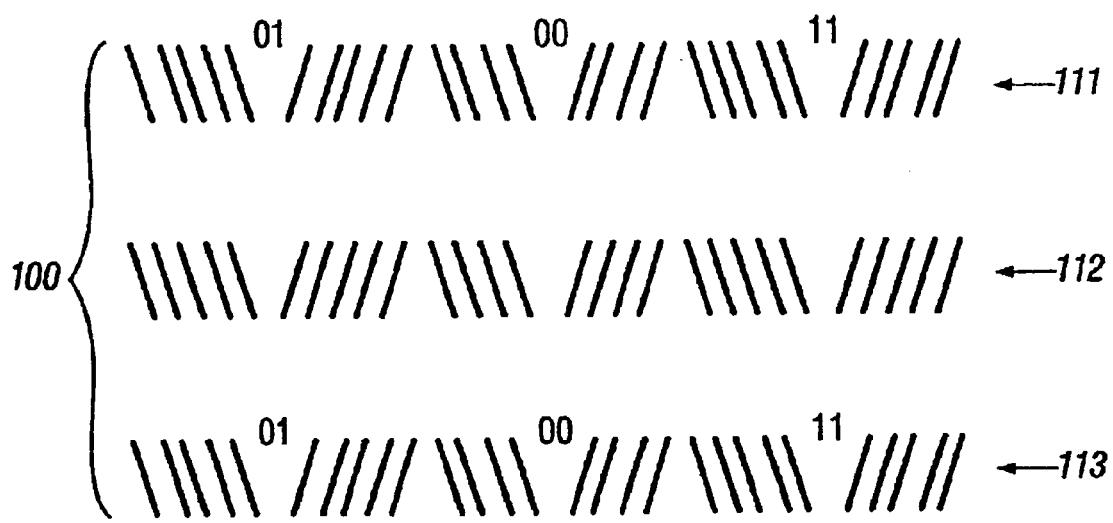
FIG. 4 is a representation of segments of three separate servo bands of FIG. 1, having an embodiment of selected different superimposed data information, in accordance with the present invention, comprising a lack of the superimposed data information in at least a portion of one of the separate servo bands.

FIG. 4 illustrates one embodiment of selected different superimposed data information in a segment 100 of magnetic tape media having three separate servo bands 111, 112 and 113, which are positioned laterally across the magnetic tape media 100. In accordance with the present invention, servo bands 111 and 113 comprise encoded superimposed information, for example, comprising adjustments in the longitudinal direction to selected non-parallel laterally extending transitions, for example representing the bit sequence " 01 00 11", and servo band 112 with a lack of superimposed data information in at least the illustrated portion of the separate servo band. In one option, the entire servo band 112 may be left without superimposed data information, or "blank". In another option, the longitudinal position information may be encoded into servo band 112, the same as with servo bands 111 and 113, but servo bands 111 and 113 have the manufacturer's information, but that portion of the superimposed data information is blank in each instance in servo band 112. In still another option, only some of the instances of manufacturer's information are left blank in servo band 112. In a further option, only some of the manufacturer's information is blank, comprising a lack of superimposed information in a portion of the servo band.

Figure 5A:
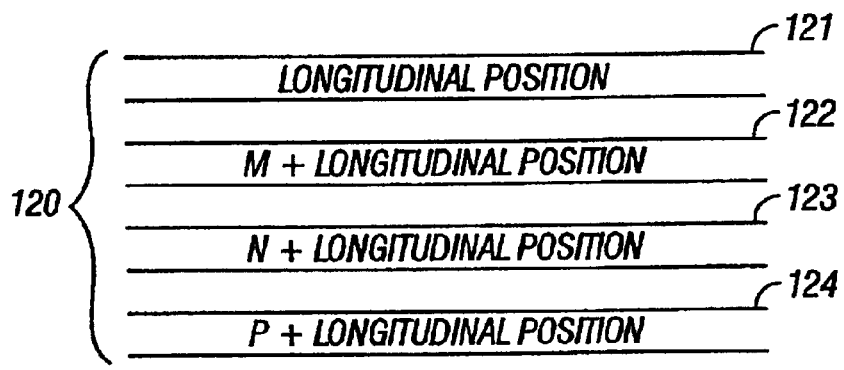
FIGS. 5A and 5B are representations of segments of separate servo bands of FIG. 1, having embodiments of selected different superimposed data information, in accordance with the present invention, comprising different longitudinal position information of the separate servo bands with respect to other servo bands.

FIG. 5A illustrates another embodiment of selected different superimposed data information in a segment 120 of magnetic tape media, in accordance with the present invention, comprising different longitudinal position information of the separate servo bands with respect to other servo bands. In the prior art, the longitudinal position information is the same in each of the servo bands to allow detection of the longitudinal position of the tape at any servo band. To allow the detection to be made without major modification, one embodiment comprises adding a constant to the longitudinal position information of one servo band with respect to another servo band. The constant may comprise a single bit, such as a high order bit, that is added to the longitudinal position information of the one servo band. In the example of FIG. 5, a constant "M" is added to the longitudinal position information of servo band 122 as compared to the longitudinal position information of servo band 121. Similarly, a constant "N" is added to the longitudinal position information of servo band 123, and a constant "P" is added to the longitudinal position information of servo band 124.

In another embodiment, the longitudinal position information is continuous, constantly increasing from one servo band to the next, and may be an appropriate option for serpentine recording.

Figure 5B:
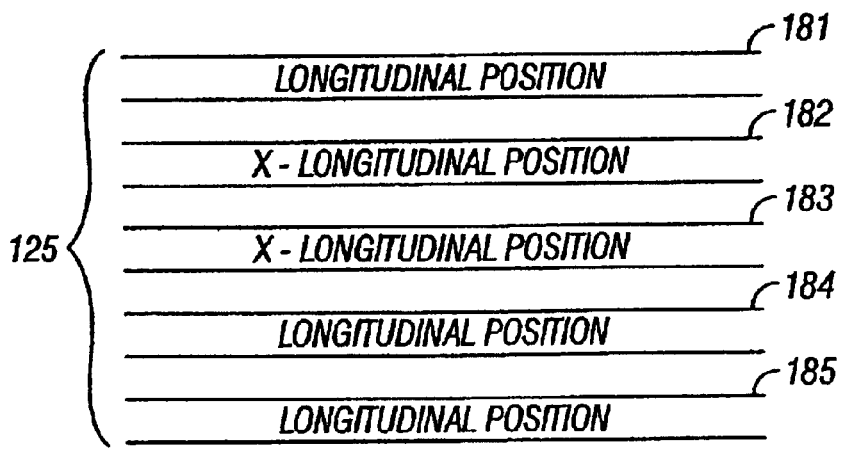

FIG. 5B illustrates a further embodiment of different longitudinal position information of the separate servo bands of a segment 125 of magnetic tape media with respect to other servo bands. In the example, separate servo bands 181, 184 and 185 have the longitudinal position information in an incrementing format, and servo bands 182 and 183 have longitudinal position information in a decrementing format of "X-longitudinal position".

FIG. 6 illustrates another embodiment of selected different superimposed data information in a segment 130 of magnetic tape media, in accordance with the present invention, comprising band identifiers provided in the superimposed data information of the separate servo bands. In one embodiment, the longitudinal position information "LPOS" is the same for each of the servo bands 131, 132, 133 and 134. The manufacturer's information 135 may also be the same for each of the servo bands. The selected different superimposed data information is band identifiers 136, 137, 138 and 139, which may comprise part of the manufacturer's information or be a separate portion of the superimposed data information. In one embodiment, the band identifiers 136, 137, 138 and 139 are binary numbers at one or more known locations of the manufacturer's information or at a known location of the servo bands. In another embodiment, the band identifiers 136, 137, 138 and 139 are identified as such with a special binary pattern or symbol which is a part of the identifier or at a known offset to it, and may or not be at a known location of the servo bands. The special binary pattern may allow symbol framing for determining the band identifier. The band identifier may comprise one or more symbols, each of which comprises more than one bit.

FIG. 7 illustrates an embodiment of combined selected different superimposed data information illustrated in a segment 140 of magnetic tape media, in which band identifiers 146 and 147 are provided in the superimposed data information of separate servo bands 151 and 153, and separate servo bands 152 and 154 lack superimposed data information in a portion 156 and 157 of the servo band. In one embodiment, the longitudinal position information "LPOS" is the same for each of the servo bands 151, 152, 153 and 154. The manufacturer's information 155 may be the same for each of servo bands 151 and 153. The manufacturer's information and band identifier portion of the separate servo bands 152 and 154 is blank. Other combinations may be envisioned by those of skill in the art.

Referring to FIG. 4, the example illustrates servo information comprising patterns of bursts of the laterally extending transitions, with a transition of each of a pair of transitions positioned in a separate one of the bursts in a pattern, to provide timing based lateral servo information. The patterns of the separate servo bands 111, 112, 113 are laterally aligned. The superimposed data information comprises longitudinal position shifts to the selected pairs of transitions, such as is illustrated in FIG. 3. In the example of FIG. 4, the selected different superimposed data information comprises longitudinal position shifts to selected pairs of transitions of patterns 111 and 113, and a lack of longitudinal position shifts to pairs of transitions of pattern 112.

Thus, in each of the above embodiments, the selected different superimposed data information of the servo bands may comprise one or more portions of the servo bands. Once the selected different superimposed data information is employed to identify the servo band being read by the servo transducer, the determination does not need to be repeated. Only if the servo transducer is moved out of a servo band, for example, to another servo band, does the open loop character of the servo system require that the newly encountered servo band be identified.

Figure 8:
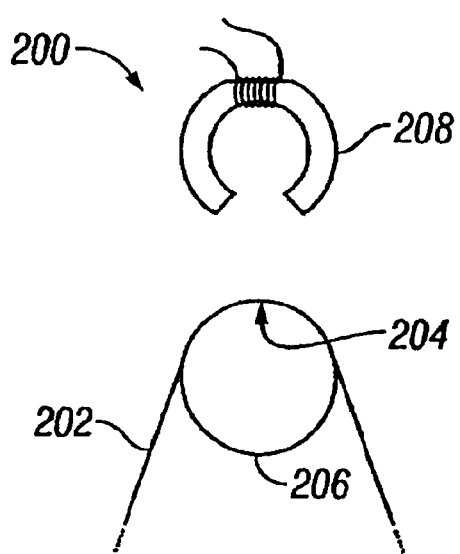
FIG. 8 is a schematic representation of an embodiment of a magnetic imprinter in accordance with the present invention, which magnetically imprints the non-parallel laterally extending transitions of a plurality of separate servo bands on a magnetic tape media.

FIG. 8 illustrates an embodiment of a magnetic imprinter servo writer 200 in accordance with the present invention, which magnetically imprints the non-parallel laterally extending transitions of a plurality of separate servo bands on a magnetic tape media in accordance with methods of the present invention. A magnetic tape 202 onto which the servo patterns are to be recorded is wound around a curved portion of the circumference 204 of a drum 206 such that the curved portion is adjacent an electromagnet 208 on the opposite side of the tape that projects a magnetic field of flux outwardly toward the tape. A sequence of raised bands is provided on the circumference 204 of the drum in the desired servo pattern with the superimposed data information. As is understood by those of skill in the art, the drum 204 shields the magnetic tape with which the raised bands have contact, while the external electromagnet 208 projects a magnetic field onto the tape, leaving the desired servo pattern of detectable transitions imprinted on the magnetic tape. The incorporated '065 patent discusses the technique in more detail.

In accordance with the present invention, the sequence of raised bands provided on the circumference 204 of the drum 206 comprises at least one of the patterns of non-parallel laterally extending transitions of a plurality of separate servo bands of FIGS. 4, 5A, 5B, 6 or 7 to provide selected different superimposed data information to identify the separate servo bands in accordance with the present invention, comprising a lack of superimposed data information in at least a portion of at least one separate servo band 112 of FIG. 4; comprising different longitudinal position information of the separate servo bands with respect to other servo bands of FIGS. 5A, 5B; comprising band identifiers of FIG. 6; or a combination, such as that illustrated in FIG. 7. The tape 202 is moved longitudinally by a drive or by the drum 206 relative to the servo writer 200, and the servo writer is positioned to write two or more of the separate servo bands on the tape, the separate servo bands positioned in sequence laterally across the tape; and the servo writer is operated to energize electromagnet 208 to write the separate servo bands on the tape.

A result of the magnetic imprinter 200 of FIG. 8 is that the drum continually rotates such that the patterns of the servo bands are continually repeated on the magnetic tape 202. Thus, the magnetic tape need not be moved longitudinally significant distances to determine the servo band that is being sensed.

Figure 9:
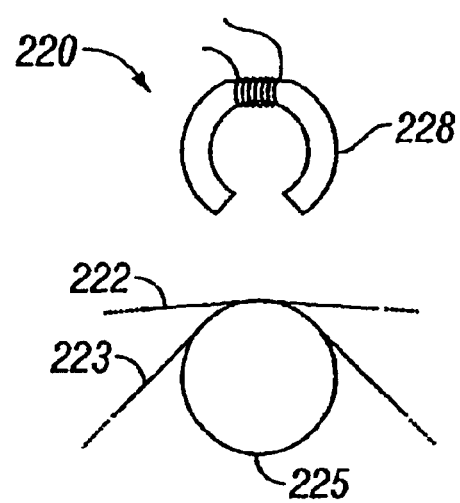
FIG. 9 is a schematic representation of an alternative embodiment of a magnetic imprinter in accordance with the present invention, which employs a master tape to magnetically imprint the non-parallel laterally extending transitions of a plurality of separate servo bands on a magnetic tape media.

Another embodiment of a magnetic imprinter servo writer 220 is illustrated in FIG. 9 in accordance with the present invention, which magnetically imprints the non-parallel laterally extending transitions of a plurality of separate servo bands on a magnetic tape media in accordance with methods of the present invention to provide selected different superimposed data information with respect to the separate servo bands. The magnetic imprinter 220 and methods are similar to the methods employed in the video tape industry to transfer video information from a master tape to a slave magnetic tape. As is known to those of skill in the art, the prerecorded master tape 222 has a coercivity different than that of a slave tape 223, such that, as the tapes are in contact on the surface of a drum 225 in the presence of an electromagnet 228, the magnetic pattern of the master tape 222 is imprinted on the slave tape 223.

In accordance with the present invention, at least one of the servo band patterns of the master tape 222 comprises one of the patterns of FIG. 4, comprising a lack of superimposed data information in at least a portion of at least one separate servo band 112; or comprising different longitudinal position information of the separate servo bands with respect to other servo bands of FIGS. 5A, 5B; or comprising band identifiers of FIG. 6; or a combination, such as that illustrated in FIG. 7. The tape 223 is moved longitudinally relative to the servo writer 220 by a drive or the drum 225, and the servo writer is positioned to write two or more of the separate servo bands on the tape, the separate servo bands positioned in sequence laterally across the tape; and the servo writer is operated to energize electromagnet 208 as master tape 222 is moved longitudinally in contact with and at the same rate as the tape 223 to write the separate servo bands on the tape 223.

The master tape 222 of FIG. 9 may be the same length as the slave tape 223, such that the patterns of the servo bands may or may not repeat. Thus, the patterns of the servo bands may or may not be continually repeated on the magnetic tape 223. If not repeated, the magnetic tape will need to be moved longitudinally to the differentiating characteristic portion of the tape determine the servo band that is being sensed.

Figure 10:
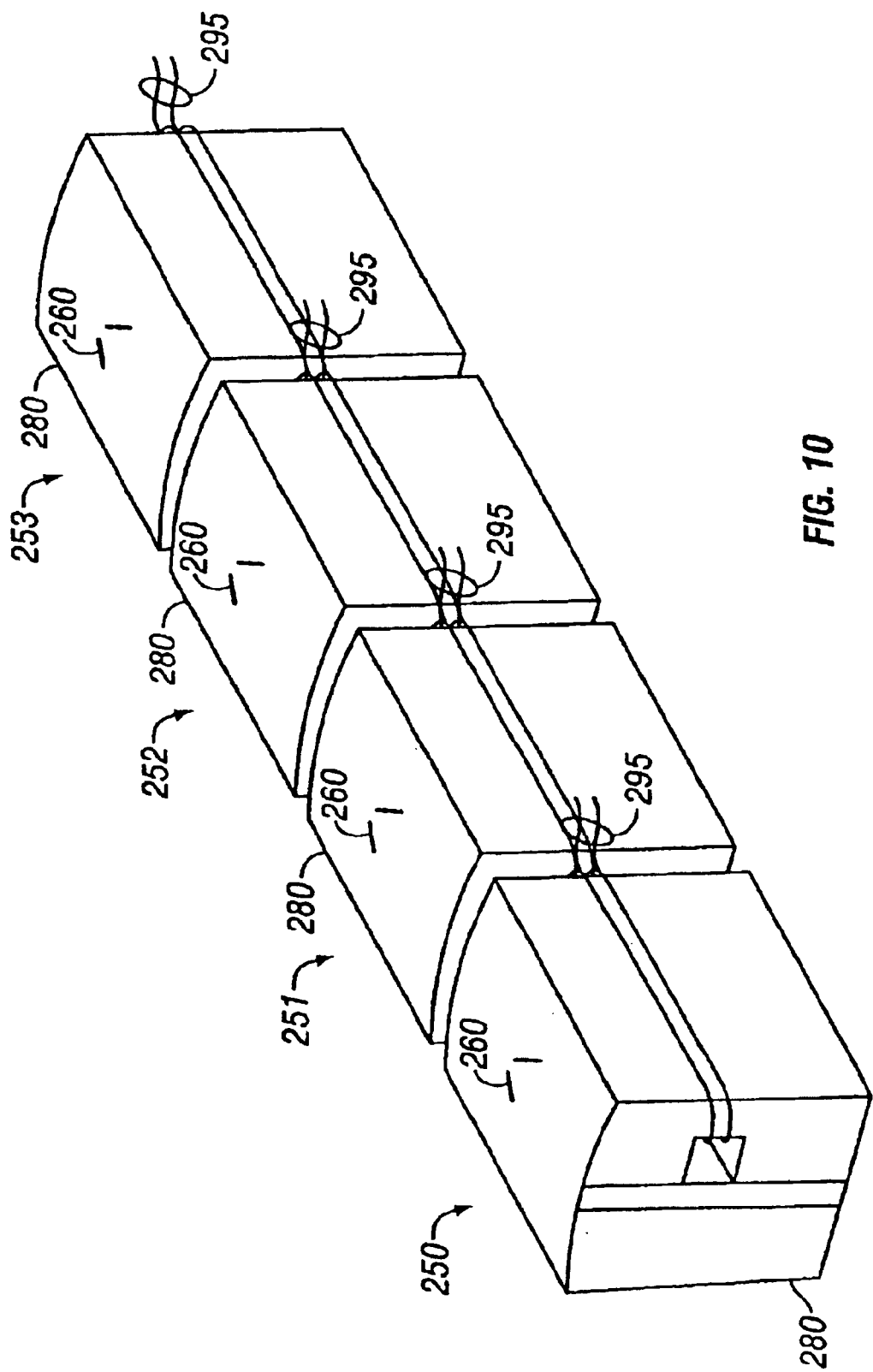
FIG. 10 is perspective representation of a servo write head that can magnetically write the non-parallel laterally extending transitions of a plurality of separate servo bands on a magnetic tape media.
Figure 11:
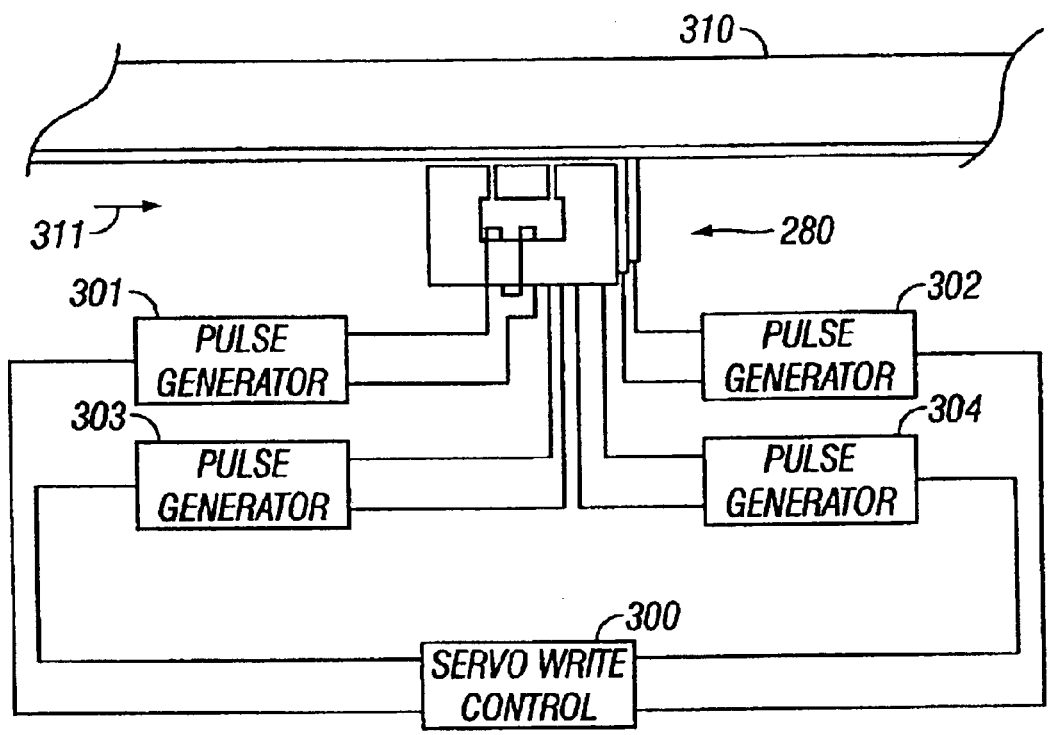
FIG. 11 is a schematic and block representation of servo writing apparatus in accordance with the present invention, for magnetically writing the non-parallel laterally extending transitions of a plurality of separate servo bands on a magnetic tape media.

FIGS. 10 and 11 illustrate an embodiment of servo writing apparatus in accordance with the present invention, for magnetically writing the non-parallel laterally extending transitions of a plurality of separate servo bands on a magnetic tape media in accordance with methods of the present invention. The servo writer comprises a plurality of servo write heads 250, 251, 252 and 253. Each of the servo write heads comprises a single multi-gap write head 280 with a pair of gaps 260, for writing pairs of the non-parallel laterally extending transitions. A drive moves the tape longitudinally, and the write heads 280 of the separate servo write heads 250, 251, 252 and 253 are employed with separate coils 295 to pulse the gaps with varied timings to record the transitions of the separate servo bands. An example of construction of servo write heads is provided in the incorporated '065 patent.

Referring additionally to FIG. 11, as a drive moves a magnetic tape media 310 longitudinally in the direction of arrow 311, the servo writer is operated in accordance with the present invention by a servo write control 300 which operates pulse generators 301, 302, 303 and 304 to magnetically pulse coils 295 of the write heads 280, e.g. of separate servo write heads 250, 251, 252 and 253, to record the non-parallel laterally extending transitions of the plurality of separate servo bands on the magnetic tape media 310 in accordance with methods of the present invention to provide selected different superimposed data information with respect to the separate servo bands. In accordance with the present invention, the timing of the pulses of pulse generators 301, 302, 303 and 304 operated by servo write control 300 magnetically pulses coils 295 of the write heads 280 to form the selected different superimposed data information patterns, such as to form the pattern of FIG. 4, comprising a lack of superimposed data information in at least a portion of at least one separate servo band 112; to form different longitudinal position information of the separate servo bands with respect to other servo bands of FIGS. 5A, 5B; to form band identifiers of FIG. 6; or to form a combination, such as that illustrated in FIG. 7.

Figure 12:
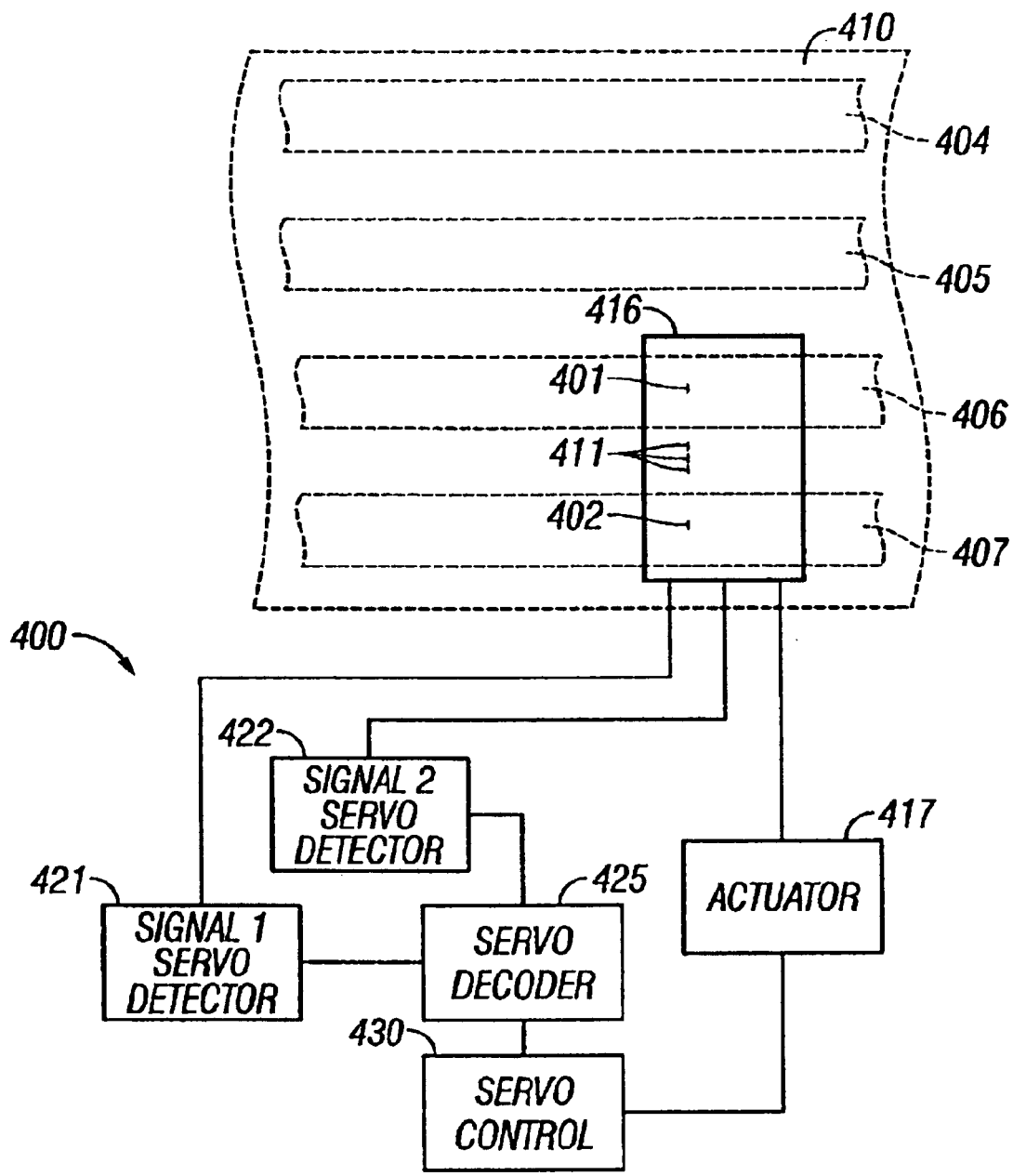
FIG. 12 is a schematic and block representation of servo transducers and a servo reader in accordance with the present invention, for reading servo information of a plurality of separate servo bands on a magnetic tape media.

FIG. 12 illustrates an embodiment of a servo reader 400 for reading servo information detected by at least one of servo transducers 401 and 402 from at least one of a plurality of separate servo bands 404, 405, 406 and 407 of a magnetic tape media 410. The separate servo bands are laterally positioned on the magnetic tape media, and are identifiable in accordance with the present invention. As discussed above, data tracks are positioned between the servo bands and read and/or written by read and/or write elements 411 of a head 416, with the separate servo transducers 401, 402 offset from the read and/or write elements, so as to track follow the servo track or tracks to guide the head along the data tracks.

The servo bands 404, 405, 406 and 407 comprise one of the patterns of non-parallel laterally extending transitions of a plurality of separate servo bands of FIGS. 4, 5A, 5B, 6 or 7 to provide selected different superimposed data information to identify the separate servo bands in accordance with the present invention, comprising a lack of superimposed data information in at least a portion of at least one separate servo band 112 of FIG. 4; comprising different longitudinal position information of the separate servo bands with respect to other servo bands of FIGS. 5A, 5B; comprising band identifiers of FIG. 6; or a combination, such as that illustrated in FIG. 7. The timing of the signal derived from reading at any point across the width of such a pattern varies continuously as the servo transducer 401, 402 of FIG. 12 is moved laterally across the servo track, since the servo transducer 20 is small compared to the width of the servo pattern. Lateral position sensing is achieved by deriving a ratio of two servo pattern intervals A and B of FIG. 2 and therefore is insensitive to tape speed during reading.

Each of the servo bands 404, 405, 406 and 407 provides the track following servo guidance for a group of data tracks, and the tape head is repositioned laterally within a servo band to access different data tracks, and is repositioned laterally to another servo band to access still further data tracks. The lateral positioning of the tape head 416 between servo bands is typically, accomplished by an actuator 417, which typically operates in open loop with feedback. Thus, as the tape head is repositioned between the servo bands, there is no feedback from the servo information to indicate that the switch from one servo band to any other servo band was successful, and, if the servo bands are substantially indistinguishable, at the supposed completion of the lateral movement, the tape head may be positioned at the wrong servo band, and the servo information will not indicate an error.

In accordance with an aspect of the present invention, wherein the separate servo bands 404, 405, 406 and 407 are positioned laterally across the magnetic tape, at least one of separate servo bands is provided with selected different superimposed data information to identify the separate servo bands in accordance with the present invention, the servo reader 400 employs the selected different superimposed data information to identify the separate servo bands.

In the embodiment of FIG. 12, the detectable transitions sensed by the servo transducers 401 or 402 are detected by a corresponding servo detector 421 and 422. Either a desired one of the servo detectors 421 or 422 may be operated at a time, or both may be operated simultaneously. The servo detector 421, 422 detects the timing of the detectable transitions as sensed by the associated servo transducer 401, 402 to determine the lateral track position of the associated servo transducer with respect to the lateral width of the sensed separate servo band. Additionally a decoder 425 determines, from the detected transitions by detector 421 and/or 422, which of the separate servo bands is being sensed by the transducer.

If the selected different superimposed data information comprises superimposed data information in at least one of the separate servo bands of FIG. 4, e.g. servo bands 111 and 113, and a lack of superimposed data information in at least a portion of at least another separate servo band, e.g. separate servo band 112, the relative timing of the detectable transitions is sensed by the servo detector 421, 422, and the decoder determines whether there is superimposed data information in the detected servo band, and thereby determines which of the separate servo bands is being sensed by the transducer.

If the selected different superimposed data information comprises different longitudinal position information of the separate servo bands with respect to other servo bands, as illustrated by the servo bands 121, 122, 123, 124 of FIG. 5A, the relative timing of the detectable transitions is sensed by the servo detector 421, 422, and the decoder determines whether there is a difference in the longitudinal position information in the detected servo band, such as whether a constant has been added to the longitudinal position information, and what the constant is, and thereby determines which of the separate servo bands is being sensed by the transducer. Alternatively, for example, if the selected different longitudinal position information is effectively incrementing in one direction in some servo bands and decrementing in some others (e.g. down from a maximum value) as illustrated by servo bands 181, 182, 183, 184, 185 of FIG. 5B, the decoder may look at each servo read transducer (either simultaneously or sequentially) and determine if it is seeing an incrementing or a decrementing longitudinal position. For example, if the tape head, e.g. tape head 16 of FIG. 1, is positioned such that the servo read transducers 20, 21 see servo bands 183 and 184 of FIG. 5B and the tape is moving in the forward direction, the top servo read transducer reading servo band 183 will see a decrementing longitudinal position and the bottom servo read transducer reading servo band 184 will see an incrementing longitudinal position. When the tape is moving in the opposite direction, the decoder will see the longitudinal position change in an opposite direction. The decoder thus employs the direction of tape movement and the incrementing/decrementing of longitudinal position information at each servo read transducer to determine which servo bands are being sensed.

If the selected different superimposed data information comprises band identifiers, as illustrated by the band identifiers 136, 137, 138 and 139 of FIG. 6, the relative timing of the detectable transitions is sensed by the servo detector 421, 422, and the decoder determines the band identifier, and thereby determines which of the separate servo bands is being sensed by the transducer.

A servo control 430 operates the actuator 417 to position the magnetic tape head 416 laterally with respect to the magnetic tape media 410 in accordance with the detection of the servo detector 421, 422 and the servo band identification determination of the decoder 425.

Figure 13:
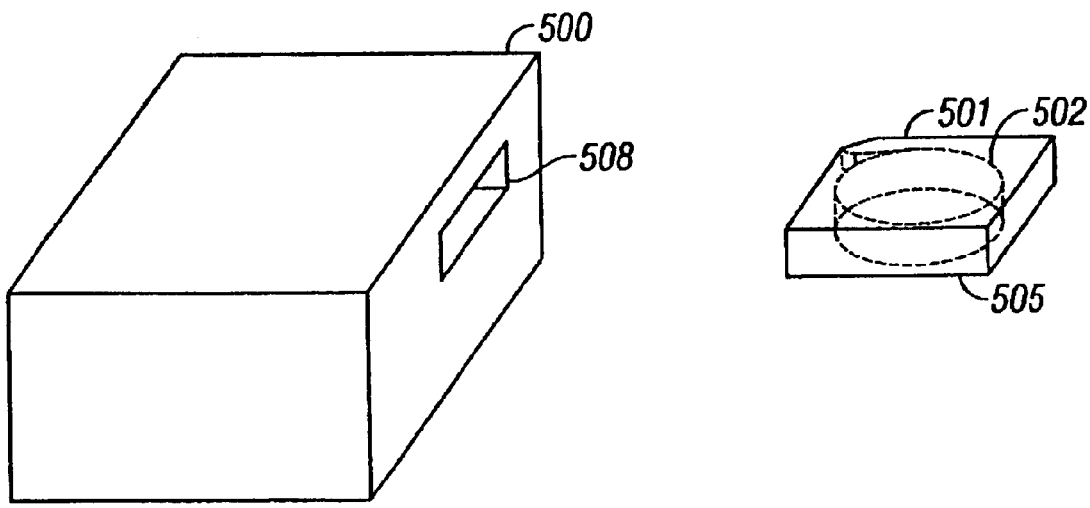
FIG. 13 is a schematic representation of a magnetic tape drive employing the servo reader of FIG. 12 and a magnetic tape media cartridge employing separate servo bands on magnetic tape media, in accordance with the present invention.

FIG. 13 illustrates a magnetic tape drive 500 employing the servo reader of FIG. 12, and a magnetic tape media cartridge 501 having a magnetic tape media 502 with separate servo bands on magnetic tape media, in accordance with the present invention.

The magnetic tape media cartridge 501 comprises a cartridge housing 505, and a magnetic tape media 502 housed within the cartridge housing. The magnetic tape media has servo information comprising a plurality of separate servo bands of at least one pattern of detectable non-parallel laterally extending transitions positioned longitudinally along the magnetic tape media. The separate servo bands are positioned laterally across the magnetic tape media; and at least one of the separate servo bands has selected different superimposed data information with respect to at least another of the separate servo bands, as discussed above.

The magnetic tape drive 500 reads and/or writes data with respect to a magnetic tape media, such as the magnetic tape media 502 of cartridge 501. The cartridge 501 is loaded into the magnetic tape drive 500 at loader 508. The magnetic tape drive 500 has a magnetic tape head, such as head 416 of FIG. 12, and read and/or write channel for reading and/or writing data on the magnetic tape media 502 of FIG. 13. A drive mechanism moves the magnetic tape media longitudinally with respect to the magnetic tape head, and an actuator, such as actuator 417 of FIG. 12, positions the magnetic tape head 416 laterally with respect to the magnetic tape media. At least one servo transducer narrower than the lateral width of the separate servo bands, such as servo transducers 401, 402, sense the detectable transitions from at least one of the plurality of separate servo bands. A servo detector, such as servo detectors 421, 422, detects the detectable non-parallel laterally extending transitions as sensed by the servo transducer or transducers to determine the lateral track position of the servo transducer with respect to the lateral width of the separate servo bands, and the servo decoder 425 determines, from the detected transitions, which of the separate servo bands is being sensed by the transducer, as discussed above with respect to FIG. 12, and a servo control operates an actuator to position the head accordingly.

The illustrated components and/or steps may be varied, combined, or combined functions may be separated, as is known to those of skill in the art. The discussed method may be altered, or steps may be omitted, or other steps added, as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A magnetic tape media having prerecorded servo information with superimposed data information, comprising:
   a plurality of separate servo bands extending longitudinally along said magnetic tape media; and comprising servo information and data information superimposed in said servo information; said servo information comprising pairs of non-parallel laterally extending transitions indicating lateral positioning across said servo band, each said separate servo band laterally offset from and providing lateral servo information for a plurality of parallel longitudinally extending data traks; said superimposed data information comprising adjustments in the longitudinal direction to selected said non-parallel laterally extending transitions; and
   said separate servo bands having selected different said superimposed data information of said servo and superimposed data information, to identify said separate servo bands;
   wherein said selected different superimposed data information comprises a lack of said superimposed data information in at least a portion of at least one of said plurality of separate servo bands, to identify said separate servo bands.

2. A method for writing a plurality of separate servo bands on a magnetic tape media, said separate servo bands positioned laterally across said magnetic tape media, comprising the steps of:
   moving said magnetic tape media longitudinally relative to at least one servo writer, said servo writer positioned to write a plurality of separate servo bands longtudinally on said magnetic tape media, said separate servo bands positioned laterally across said magnetic tape media; and
   operating said at least one servo writer to write servo information as said plurality of separate servo bands on said magnetic tape media, said servo information comprising pairs of non-parallel laterally extending transitions indicating lateral positioning across said servo band, and superimposing data information on said servo information, comprising adjusting in the longitudinal direction to selected said non-parallel laterally extending transitions, comprising superimposing selected different said superimposed data information of said separate servo bands, to identify said separate servo bands;
   wherein said selected different superimposed data information comprises a lack of said superimposed data information in at least a portion of at least one of said plurality of separate servo bands, to identify said separate servo bands.

3. A magnetic tape media manufactured in accordance with the method recited in claim 2.

4. A servo writing apparatus for writing a plurality of separate servo bands on a magnetic tape media, said separate servo bands positioned laterally across said magnetic tape media, comprising:
   a drive for moving said magnetic tape media longitudinally; and
   at least one servo writer positioned to write a plurality of separate servo bands longitudinally on said magnetic tape media, said separate servo bands positioned laterally across said magnetic tape media; and said at least one servo writer writing servo information as said plurality of separate servo bands on said magnetic tape media as said drive moves said magnetic tape media longitudinally relative to said at least one servo writer, said servo information comprising pairs of non-parallel laterally extending transitions indicating lateral positioning across said servo band, and superimposing data information on said servo information, comprising adjusting in the longitudinal direction to selected said non-parallel laterally extending transitions, comprising superimposing selected different said superimposed data information of said separate servo bands, to identify said separate servo bands;
   wherein said at least one servo writer writes said selected different superimposed data information as comprising a lack of said superimposed data information in at least a portion of at least one of said plurality of separate servo bands, to identify said separate servo bands.

5. The servo writing apparatus of claim 4, wherein said at least one servo writer comprises a magnetic imprinter; and wherein said magnetic imprinter magnetically imprints said pairs of non-parallel laterally extending transitions of said plurality of separate servo bands on said magnetic tape media, superimposing said data information on said servo information, comprising positioning said selected non-parallel laterally extending transitions at adjustable positions in said longitudinal direction to superimpose said selected different superimposed data information of said separate servo bands, to identify said separate servo bands.

6. A magnetic tape cartridge, comprising:
   a cartridge housing; and
   a magnetic tape media housed within said cartridge housing, said magnetic tape media having servo information comprising:
      a plurality of separate servo bands extending longitudinally along said magnetic tape media; and comprising servo information and data information superimposed in said servo information; said servo information comprising pairs of non-parallel laterally extending transitions indicating lateral positioning across said servo band, each said separate servo band laterally offset from and providing lateral servo information for a plurality of parallel longitudinally extending data tracks; said superimposed data information comprising adjustments in the longitudinal direction to selected said non-parallel laterally extending transitions; and
      said separate servo bands having selected different said superimposed data information of said servo and superimposed data information, to identify said separate servo bands;
      wherein said selected different superimposed data information comprises a lack of said superimposed data information in at least a portion of at least one of said plurality of separate servo bands, to identify said separate servo bands.

7. A magnetic tape drive for reading and/or writing data with respect to a magnetic tape media, said magnetic tape media having prerecorded servo information in a plurality of separate servo bands extending longitudinally with respect to said magnetic tape media, said servo information comprising servo information and data information superimposed in said servo information; said servo information comprising pairs of non-parallel laterally extending transitions indicating lateral positioning across said servo band, each said separate servo band laterally offset from and providing lateral servo information for a plurality of parallel longitudinally extending data tracks; said superimposed data information comprising adjustments in the longitudinal direction to selected said non-parallel laterally extending transitions; and said separate servo bands positioned laterally across said magnetic tape media, comprising:

a magnetic tape head and read and/or write channel for reading and/or writing data on said magnetic tape media;

a drive mechanism for moving said magnetic tape media longitudinally with respect to said magnetic tape head;

an actuator for positioning said magnetic tape head laterally with respect to said magnetic tape media;

at least one servo transducer narrower than the lateral width of said separate servo bands, for sensing said laterally extending transitions from at least one of said plurality of separate servo bands;

a servo detector for detecting the timing of said laterally extending transitions as sensed by said at least one servo transducer to determine the lateral track position of said at least one servo transducer with respect to said lateral width of said separate servo bands;

a decoder for decoding from said detected timing of said laterally extending transitions, said superimposed data information comprising said adjustments in said longitudinal direction to selected said non-parallel laterally extending transitions, and detecting from said decoded superimposed data information, selected different said superimposed data information of said separate servo bands for identifying said separate servo bands, and determining, from said detected different said superimposed data information, which of said at least one of said separate servo bands is being sensed by said at least one servo transducer; and a servo control for operating said actuator to position said magnetic tape head laterally with respect to said magnetic tape media in accordance with said detection of said servo detector and said determination of said decoder;

wherein said selected different superimposed data information comprises a lack of said superimposed data information in at least a portion of at least one of said plurality of separate servo bands, to identify said separate servo bands; and wherein said decoder determines, from said lack of said superimposed data information in at least a portion of at least one of said plurality of separate servo bands, which of said at least one of said separate servo bands is being sensed by said at least one servo transducer.

* * * * *